United States Patent
Shi

(10) Patent No.: US 9,967,790 B2
(45) Date of Patent: May 8, 2018

(54) METHOD AND DEVICE FOR MOVING UE

(71) Applicant: ZTE Corporation, Shenzhen (CN)

(72) Inventor: Lirong Shi, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days. days.

(21) Appl. No.: 15/108,419

(22) PCT Filed: Jun. 17, 2014

(86) PCT No.: PCT/CN2014/080145
§ 371 (c)(1),
(2) Date: Jun. 27, 2016

(87) PCT Pub. No.: WO2015/096413
PCT Pub. Date: Jul. 2, 2015

(65) Prior Publication Data
US 2016/0323793 A1  Nov. 3, 2016

(30) Foreign Application Priority Data
Dec. 26, 2013 (CN) .......................... 2013 1 0733322

(51) Int. Cl.
H04W 36/10 (2009.01)
H04W 36/00 (2009.01)

(52) U.S. Cl.
CPC ....... *H04W 36/10* (2013.01); *H04W 36/0061* (2013.01)

(58) Field of Classification Search
CPC ............... H04W 84/045; H04W 88/08; H04W 36/0083; H04W 36/0011; H04W 36/0055;
(Continued)

(56) References Cited

U.S. PATENT DOCUMENTS 8,045,987 B2 * 10/2011 Rudolf .................. H04W 36/12
455/436
9,379,862 B2 * 6/2016 Shi ........................... H04L 5/001
(Continued)

FOREIGN PATENT DOCUMENTS

| CN | 101068432 A | 11/2007 |
| CN | 101622903 A | 1/2010 |
| CN | 103392376 A | 11/2013 |

OTHER PUBLICATIONS

International Search Report for corresponding application PCT/CN2014/080145 filed on Jun. 17, 2014; dated Sep. 16, 2014.
(Continued)

*Primary Examiner* — Nizar Sivji
(74) *Attorney, Agent, or Firm* — Cantor Colburn LLP

(57) ABSTRACT

Provided is a method and device for moving a User Equipment (UE). The method includes that: a Radio Network Controller (RNC) receives a first message; according to a decision rule, the RNC decides whether a target RNC Cluster corresponding to the first message is the RNC Cluster where the RNC is located, wherein the RNC Cluster is composed of one or more RNCs; if the decision result is yes, the RNC sends a second message to perform internal processing of the RNC Cluster; or, if the decision result is no, the RNC sends the second message to the target RNC Cluster. The disclosure can avoid call drop when the UE moves between the RNCs, thereby guaranteeing the continuous reception of a service.

10 Claims, 7 Drawing Sheets

(58) Field of Classification Search
CPC ... H04W 36/12; H04W 84/22; H04W 92/045; H04W 84/042; H04W 88/12; H04W 76/045; H04W 16/06; H04W 36/0016; H04W 48/04; H04W 52/0209; H04W 92/14; H04W 16/00; H04W 36/0033; H04W 36/0061; H04W 36/18; H04W 36/22; H04W 40/00; H04W 48/10; H04W 48/20; H04W 4/02; H04W 4/028; H04W 4/20; H04W 52/343; H04W 72/0426; H04W 72/048; H04W 72/0493; H04W 72/1268; H04W 76/02; H04W 76/028; H04L 12/5692; H04L 12/46; H04L 43/16; H04N 21/2402; H04N 21/64738
See application file for complete search history.

(56) References Cited

U.S. PATENT DOCUMENTS

| | | | | |
|---|---|---|---|---|
| 2004/0071126 | A1* | 4/2004 | Ramos-Escano | H04L 29/12801 370/349 |
| 2005/0213555 | A1* | 9/2005 | Eyuboglu | H04J 3/0682 370/349 |
| 2008/0254782 | A1* | 10/2008 | Nakamata | H04W 92/14 455/418 |
| 2012/0106514 | A1* | 5/2012 | Zheng | H04W 36/32 370/331 |
| 2012/0208579 | A1* | 8/2012 | Persson | H04W 88/12 455/507 |
| 2015/0173011 | A1* | 6/2015 | Das | H04W 16/26 370/328 |

OTHER PUBLICATIONS

"3rd Generation Partnership Project; Technical Specification Group Radio Access Network; Ultran overall description (Release 12)", 3GPP Draft; 25401-C00, 3rd Generation Partnership Project (3GPP), Mobile Competence Centre; Dec. 17, 2013; XP050916580.

Nokia et al. "Extension of RNC-ID", 3GPP Draft; R3-70280, 3rd Generation Partnership Project (3GPP), Mobile Competence Centre; May 14, 2007, vol. CT W4, No. Beijing; XP050037991.

Nokia Simens Networks et al. "Proposed reply to LS on Removal of limitation of SRNC identity", 3GPP Draft; S2-071941; 3rd Generation Partnership Project (3GPP), Mobile Competence Centre; Apr. 18, 2007, vol. SA WG2, No. Bejing; XP05025967.

* cited by examiner

METHOD AND DEVICE FOR MOVING UE

TECHNICAL FIELD

The disclosure relates to a mobile communication system and in particular to a method and device for moving User Equipment (UE).

BACKGROUND

The Universal Mobile Telecommunication System (UMTS) belongs to the 3rd generation communication system; the network part of the UMTS is called UMTS Universal Terrestrial Radio Access Network (UTRAN), and the UTRAN structure is divided into a Radio Access Network (RAN) and a Core Network (CN), wherein the RAN is used for processing all radio-related functions, and the CN processes the switching and routing with an external network of all voice calls and data connections. The two units constitute the whole system together with the UE. A network unit of the RAN includes a Radio Network Controller (RNC) and a transreceiver base station (NodeB). To be able to differentiate each UE in the UTRAN, a UTRAN Radio Network Temporary Identity (U-RNTI) is defined; the length of the U-RNTI is 32 bits, and the U-RNTI is composed of two parts: a Serving RNC (SRNC) Identity (ID) and an SRNC RNTI (S-RNTI), wherein, the SRNC ID represents the serving RNC identity whose meaning is the same as that of an RNC ID, and the S-RNTI represents the RNTI of the SRNC. The SRNC ID is defined as 12 bits, and the S-RNTI is defined as 20 bits; if the SRNC ID has more than 12 bits, then the part exceeding the 12 bits is in the S-RNTI.

When moving between the RNCs, the public UE sends a Cell Update message or a UTRAN Registration Area (URA) Update message to a Drift RNC (DRNC), wherein the message carries the U-RNTI, and then the DRNC resolves, according to the U-RNTI carried in the message, the RNC ID to determine which RNC the message should be sent to. In the current protocol, there are two types of RNC IDs: one is a general RNC ID, which is 12 bits at most, and the other is an extended RNC ID, which can be extended to 16 bits at most; but the DRNC does not know whether the SRNC adopts the general RNC ID or the extended RNC ID, according to the related art, there are several cases as follows: (1) if the target RNC ID is actually the general RNC ID, and the DRNC resolves according to the general RNC ID, then the message will be sent to the target RNC correctly; (2) if the target RNC ID is actually the extended RNC ID, and the DRNC resolves according to the general RNC ID, then the message may be sent to the target RNC correctly or sent incorrectly; (3) if the target RNC ID is actually the extended RNC ID, and the DRNC resolves according to the extended RNC ID, then the message will be sent to the target RNC correctly; (4) if the target RNC ID is actually the general RNC ID, and the DRNC resolves according to the extended RNC ID, then the message will be sent incorrectly. If the message is sent incorrectly, the RNC receiving the message will discard the message, which easily leads to call drop when the UE moves between the RNCs.

In addition, as to an Automatic Neighbour Relation (ANR) function in the UMTS, through a measurement control message which is sent by a network side and received by the UE in a dedicated connection state, information of a new cell is measured and reported to the network side; the reported message includes the Cell ID (C-ID) of the cell in the radio network, and the network side can know, after obtaining the message, which neighbour cells are not configured. The C-ID of the cell in the radio network has 28 bits, including the RNC ID and the C-ID in the RNC; if the RNC finds, according to the C-ID of the cell in the radio network, that the cell is not the one in the RNC, it is needed to send message obtaining information to the other RNC. However, the RNC does not know whether the other RNC adopts 12 bits or 16 bits, according to the related art, there are several cases as follows: (1) if the target RNC ID is actually the general RNC ID, and the DRNC resolves according to the general RNC ID, then the message will be sent to the target RNC correctly; (2) if the target RNC ID is actually the extended RNC ID, and the DRNC resolves according to the general RNC ID, then the message may be sent to the target RNC correctly or sent incorrectly; (3) if the target RNC ID is actually the extended RNC ID, and the DRNC resolves according to the extended RNC ID, then the message will be sent to the target RNC correctly; (4) if the target RNC ID is actually the general RNC ID, and the DRNC resolves according to the extended RNC ID, then the message will be sent incorrectly. If the message is sent incorrectly, the neighbour cells which are not configured by the RNC cannot be identified, which easily leads to call drop when the UE moves between the RNCs.

SUMMARY

The disclosure provides a method and device for moving UE, which avoid call drop when UE moves between the RNCs, thereby guaranteeing the continuous reception of a service.

For solving the above technical problem, the disclosure provides a method for moving UE, which includes that:

an RNC receives a first message;

according to a decision rule, the RNC decides whether a target RNC Cluster corresponding to the first message is the RNC Cluster where the RNC is located, wherein the RNC Cluster is composed of one or more RNCs;

if the decision result is yes, the RNC sends a second message to perform internal processing of the RNC Cluster; or, if the decision result is no, the RNC sends the second message to the target RNC Cluster.

Optionally, the RNC Cluster has an RNC Cluster ID, and the value of the RNC Cluster ID is same as the first n bits of an RNC ID of the RNC in the RNC Cluster.

Optionally, the decision rule is that: a first ID is carried in the first message, and the RNC determines the target RNC Cluster according to the first ID.

Optionally, the second message also includes a second ID, and according to the second ID, the RNC performs the internal processing of the RNC Cluster to the second message in the following processing ways:

the RNCs in the RNC Cluster share a message queue; the RNC puts the second message in the message queue, and sends an internal information request to the other RNCs in the RNC Cluster to trigger each RNC to check the second message; then each RNC decides, according to the second ID, whether the message is to be processed by it; or, the RNCs in the RNC Cluster share a message queue; the RNC decides, according to the second ID, whether the second message is to be processed by it; if so, the RNC processes the message; if not, the RNC puts the second message in the message queue, and sends the internal information request to the other RNCs in the RNC Cluster to trigger each RNC to check the external message; then each RNC or the RNC decides, according to the second ID and in combination with its own RNC ID, whether the message is to be processed by it.

Optionally, the first message is a URA Update message, the first ID is a U-RNTI, the second message is an Uplink Signalling Transfer Indication message, and the second ID is an S-RNTI; or the first message is a Cell Update message, the first ID is the U-RNTI, the second message is the Uplink Signalling Transfer Indication message, and the second ID is the S-RNTI; or the first message is a UE Information Response message, the first ID is a C-ID of the cell in a Public Land Mobile Network (PLMN), the second message is an Information Exchange Initiation Request message, and the second ID is a C-ID of the cell in the RNC.

Optionally, an internal custom message or a standard Iur interface message is adopted among the RNCs in the RNC Cluster.

The disclosure also provides an RNC, which includes:

a receiving component, which is configured to receive the first message;

a processing component, which is configured to decide, according to the decision rule, whether the target RNC Cluster corresponding to the first message is the RNC Cluster where the RNC is located, wherein the RNC Cluster is composed of one or more RNCs;

if the decision result is yes, the processing component sends the second message to perform internal processing of the RNC Cluster; or, if the decision result is no, the RNC sends the second message to the target RNC Cluster.

Optionally, the RNC Cluster has the RNC Cluster ID, and the value of the RNC Cluster ID is same as the first n bits of the RNC ID of the RNC in the RNC Cluster.

Optionally, the decision rule is that: the first ID is carried in the first message, and the processing component determines the target RNC Cluster according to the first ID.

Optionally, the second message includes the second ID, and according to the second ID, the processing component performs the internal processing of the RNC Cluster to the second message in the following processing ways:

the RNCs in the RNC Cluster share a message queue; the processing component puts the second message in the message queue, and sends the internal information request to the other RNCs in the RNC Cluster to trigger each RNC to check the second message; then each RNC decides, according to the second ID and in combination with its own RNC ID, whether the message is to be processed by it; or, the RNCs in the RNC Cluster share a message queue; the processing component decides, according to the second ID, whether the second message is to be processed by it; if so, the processing component processes the message; if not, the processing component puts the second message in the message queue, and sends the internal information request to the other RNCs in the RNC Cluster to trigger each RNC to check the external message; then each RNC or the RNC decides, according to the second ID and in combination with its own RNC ID, whether the message is to be processed by it.

Optionally, the first message is the URA Update message, the first ID is the U-RNTI, the second message is the Uplink Signalling Transfer Indication message, and the second ID is the S-RNTI; or the first message is the Cell Update message, the first ID is the U-RNTI, the second message is the Uplink Signalling Transfer Indication message, and the second ID is the S-RNTI; or the first message is the UE Information Response message, the first ID is the C-ID of the cell in the PLMN, the second message is the Information Exchange Initiation Request message, and the second ID is the C-ID of the cell in the RNC.

Optionally, the internal custom message or the standard Iur interface message is adopted among the RNCs in the RNC Cluster.

Compared with the related art, the application provides a method for moving the UE, which enables the RNC to perform message processing correctly when the UE moves between the RNCs, thereby guaranteeing the continuous reception of a service, improving the user experience, and greatly improving the performance index of network.

BRIEF DESCRIPTION OF THE DRAWINGS

The accompanying drawings are used for providing a deeper understanding of the technical solutions of the disclosure, and constitute a part of the specification; the accompanying drawings are used in combination with embodiments of the application for illustrating the technical solutions of the disclosure and not intended to form a limit to the disclosure.

DETAILED DESCRIPTION OF THE EMBODIMENTS

For making the aim, the technical solutions and the advantages of the disclosure more clear, the technical solutions are elaborated below in combination with the accompanying drawings and specific embodiments, so that those skilled in the art can understand the disclosure better and implement it, but the embodiments are not intended to limit the disclosure. Note that, the embodiments and features in the embodiments in the application can be combined with each other on condition of not conflicting.

Figure 1:
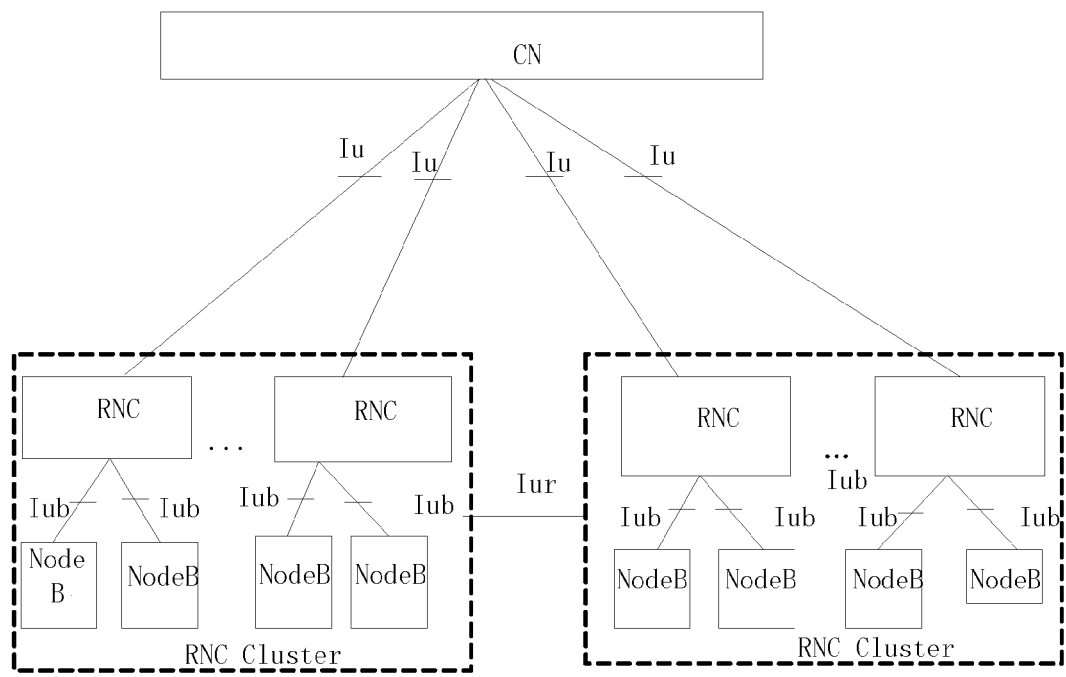
FIG. 1 is improved radio network architecture of the disclosure.

FIG. 1 is a structure of an RNC Cluster according to an embodiment 1 of the disclosure.

In the present embodiment, the RNC Cluster is composed of more RNCs, and the first n bits of the RNC IDs of the RNCs in the same RNC are the same; each RNC communicates with a CN via an Iu interface, the RNC and a NodeB are connected via an Iub interface, and the RNC Clusters are connected via an Iur interface.

A standard Iur interface message can be adopted for communication between the RNCs in the RNC Cluster; instead of adopting the standard Iur interface message, an internal custom message can be adopted; adopting the internal custom message is beneficial for simplifying a message structure, reducing a message processing length, and improving a processing efficiency.

The Iu interface, the Iub interface and the Iur interface between the RNC Clusters are still the same as the current standard interface.

The n can be equal to 12 or other values. The RNC Cluster defines an RNC Cluster ID whose value is the first n bits of the RNC ID in the RNC Cluster. The RNC Cluster includes one or more RNCs.

The first n bits of a first ID serves as the RNC Cluster ID, and the rest bits compose a second ID; the first ID is carried in a first message, and the second ID is carried in a second message.

The RNC pre-configures a neighbour RNC Cluster ID.

A data area and a message queue of the RNC in the RNC Cluster can be shared.

Figure 2:
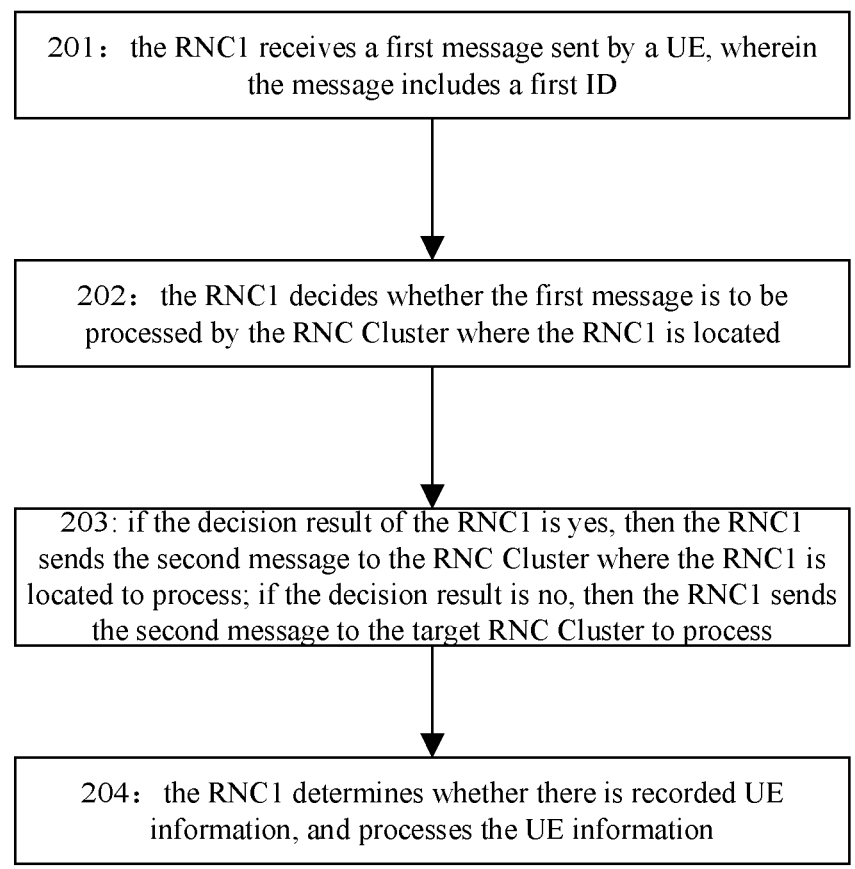
FIG. 2 is a flowchart of a message processing between RNC Clusters according to an embodiment of the disclosure.

FIG. 2 is a flowchart of a message processing between RNC Clusters according to an embodiment of the disclosure; as shown in FIG. 2, the message processing flow includes the following steps.

Step 201: the RNC1 receives the first message sent by a UE, wherein the message includes the first ID;

the RNC1 is in an RNC Cluster, the RNC Cluster has an RNC Cluster ID, and the value of the RNC Cluster ID is same as the first n bits of the RNC ID of the RNC in the RNC Cluster.

Step 202: the RNC1 decides, according to a decision rule, whether an external message (namely the first message) is to be processed by the RNC Cluster where the RNC1 is located;

the decision rule is that: the first ID is carried in the external message, and the RNC1 resolves the first n bits according to the first ID to serve as the RNC Cluster ID of a target RNC Cluster.

Step 203: if the decision result of the RNC1 is yes, that is, the RNC Cluster ID of the target RNC Cluster is the same as the RNC Cluster ID of the RNC Cluster where the RNC1 is located, and the RNC Cluster where the RNC1 is located is the target RNC Cluster, then the RNC1 sends the second message to the RNC Cluster where the RNC1 is located to process;

or, if the decision result of the RNC1 is no, that is, the RNC Cluster ID of the target RNC Cluster is different from the RNC Cluster ID of the RNC Cluster where the RNC1 is located, and the RNC Cluster where the RNC1 is located is not the target RNC Cluster, then the RNC1 sends the second message to the target RNC Cluster according to the RNC Cluster ID of the target RNC Cluster obtained in Step 202.

Sending the second message to the target RNC Cluster is sending the second message to any RNC (which can be the RNC2 in the present embodiment) in the target RNC Cluster, or to a main control component or a main control RNC in the target RNC Cluster. The main control component can be a separate processing unit or an RNC; and the way of determining the main control RNC can be statically configuring a main control RNC, or selecting a main control RNC according to a load or other factors.

According to the internal processing in Step 203, the RNC1 sends a second message, and the second message includes a second ID; the RNC1 performs the internal processing of the RNC Cluster to the second message in any one of the following ways:

the RNCs in the RNC Cluster share a message queue; the RNC1 puts the second message in the message queue, and sends an internal information request to the other RNCs in the RNC Cluster to trigger each RNC to check the external message; then each RNC decides, according to the second ID, whether the message is to be processed by it; or the RNCs in the RNC Cluster share a message queue; the RNC2 decides, according to the second ID, whether the message is to be processed by it; if so, the RNC2 processes the message; if not, the RNC2 puts the second message in the message queue, and sends the internal information request to the other RNCs in the RNC Cluster to trigger each RNC to check the second message;

each RNC or the RNC2 decides, according to the second ID, whether the message is to be processed by it; if so, the RNC composes, according to the second ID in the second message and in combination with its own RNC ID, a first ID of the UE, and finds whether there is recorded UE information according to the first ID of the UE; if not, the second message is ignored and not processed.

Wherein, the first message, the first ID, the second message and the second ID are any one of the followings:

the first message is the URA Update message, the first ID is the U-RNTI, the second message is the Uplink Signalling Transfer Indication message, the second ID is the S-RNTI; or the first message is the Cell Update message, the first ID is the U-RNTI, the second message is the Uplink Signalling Transfer Indication message, and the second ID is the S-RNTI; or the first message is the UE Information Response message, the first ID is the C-ID of the cell in the PLMN, the second message is the Information Exchange Initiation Request message, and the second ID is the C-ID of the cell in the RNC.

Step 204: only when the recorded UE information is found, the RNC processes the message, and performs relocation or non-relocation or other flows.

Figure 3:
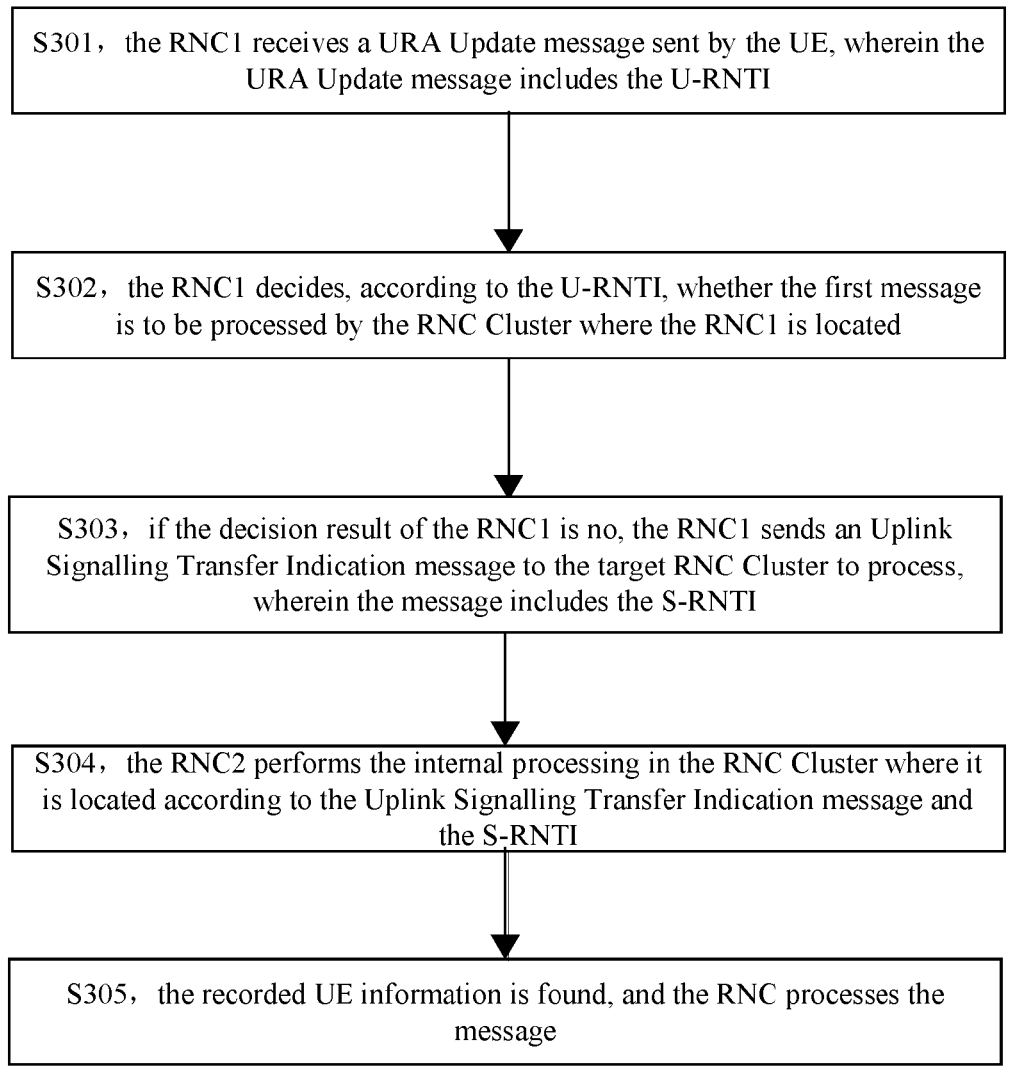
FIG. 3 is a flowchart of a URA Update processing between RNC Clusters according to an embodiment of the disclosure.

FIG. 3 is a flowchart of an URA Update processing between RNC Clusters according to an embodiment of the disclosure; as shown in FIG. 3, the processing flow specifically includes the following steps.

Step 301: the RNC1 receives the first message, namely the URA Update message, which is sent by the UE, wherein the message includes the first ID, namely the U-RNTI.

Step 302: the RNC1 resolves the first 12 bits according to the first ID, namely the U-RNTI, to serve as the RNC Cluster ID of the target RNC Cluster; and the RNC1 decides, according to the decision rule, whether the URA Update message is to be processed by the RNC Cluster where the RNC is located.

Step 303: if the decision result is no, then the URA Update message is not to be processed by the RNC Cluster where the RNC1 is located, and the second message, namely the Uplink Signalling Transfer Indication message, is sent to the target RNC Cluster according to the obtained target RNC Cluster ID, wherein the message includes the second ID, namely the S-RNTI.

Step 304: the RNC2 performs the internal processing according to the second message, namely the Uplink Signalling Transfer Indication message, which is sent by the RNC1, wherein the message includes the second ID, namely the S-RNTI.

The internal processing of the RNC Cluster is performed to the external message in any one of the following ways:

the RNCs in the RNC Cluster share a message queue; the RNC2 puts the second message, namely the Uplink Signalling Transfer Indication message, in the message queue, and sends the internal information request to the other RNCs in the RNC Cluster to trigger each RNC to check the second message; then each RNC decides, according to the second ID, namely the S-RNTI, whether the message is to be processed by it; or the RNCs in the RNC Cluster share a message queue; the RNC2 decides, according to the second ID, whether the message is to be processed by it; if so, the RNC2 processes the message; if not, the RNC2 puts the Uplink Signalling Transfer Indication message in the message queue, and sends the internal message request to the other RNCs in the RNC Cluster to trigger each RNC to check the second message;

each RNC or the RNC2 decides whether the message is to be processed by it; if so, the RNC composes, according to the S-RNTI in the message and in combination with its own RNC ID, the U-RNTI of the UE, and finds whether there is recorded UE information according to the U-RNTI of the UE; if not, the second message is ignored and not processed.

Step 305: only when the recorded UE information is found, the RNC processes the message, and performs relocation or non-relocation or other flows.

Figure 4:
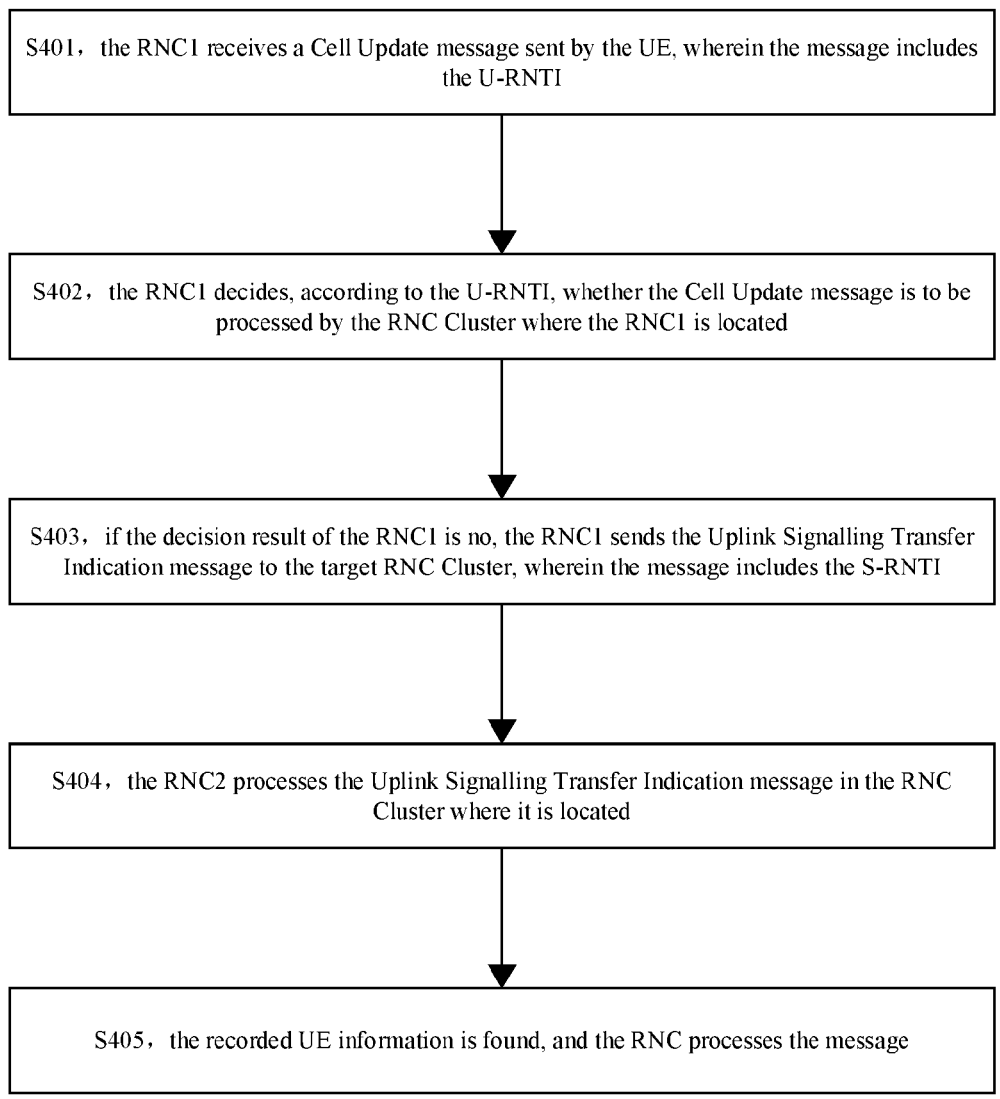
FIG. 4 is a flowchart of a Cell Update processing between RNC Clusters according to an embodiment of the disclosure.

FIG. 4 is a flowchart of a Cell Update processing between RNC Clusters according to an embodiment of the disclosure; as shown in FIG. 4, the processing flow specifically includes the following steps.

Step 401: the RNC1 receives the first message, namely the Cell Update message, which is sent by the UE, wherein the message includes the first ID, namely the U-RNTI.

Step 402: the RNC1 resolves the first 12 bits according to the U-RNTI to serve as the RNC Cluster ID of the target RNC Cluster; and the RNC1 decides, according to the decision rule, whether the Cell URA Update message is to be processed by the RNC Cluster where the RNC is located.

Step 403: if the decision result is no, then the Cell Update message is not to be processed by the RNC Cluster where the RNC1 is located, and according to the obtained target RNC Cluster ID, the RNC1 sends the Uplink Signalling Transfer Indication message to the target RNC Cluster, wherein the message includes the second ID, namely the S-RNTI.

Step 404: the RNC2 performs the internal processing according to the Uplink Signalling Transfer Indication message sent by the RNC1, wherein the message includes the S-RNTI.

The RNC2 performs the internal processing of the RNC Cluster to the Cell Update message in any one of the following ways:

the RNCs in the RNC Cluster share a message queue; the RNC2 puts the Uplink Signalling Transfer Indication message in the message queue, and sends the internal information request to the other RNCs in the RNC Cluster to trigger each RNC to check the second message; then each RNC decides, according to the second ID, whether the message is to be processed by it; or the RNCs in the RNC Cluster share a message queue; the RNC2 decides, according to the second ID, whether the message is to be processed by it; if so, the RNC2 processes the message; if not, the RNC2 puts the Uplink Signalling Transfer Indication message in the message queue, and sends the internal message request to the other RNCs in the RNC Cluster to trigger each RNC to check the second message;

each RNC or the RNC2 decides, according to the S-RNTI, whether the message is to be processed by it; if so, the RNC composes, according to the S-RNTI in the Uplink Signalling Transfer Indication message and in combination with its own RNC ID, the U-RNTI of the UE, and finds whether there is recorded UE information according to the U-RNTI of the UE; if not, the Uplink Signalling Transfer Indication message is ignored and not processed.

Step 405: only when the recorded UE information is found, the RNC processes the message, and sends a response message to the RNC1.

Figure 5:
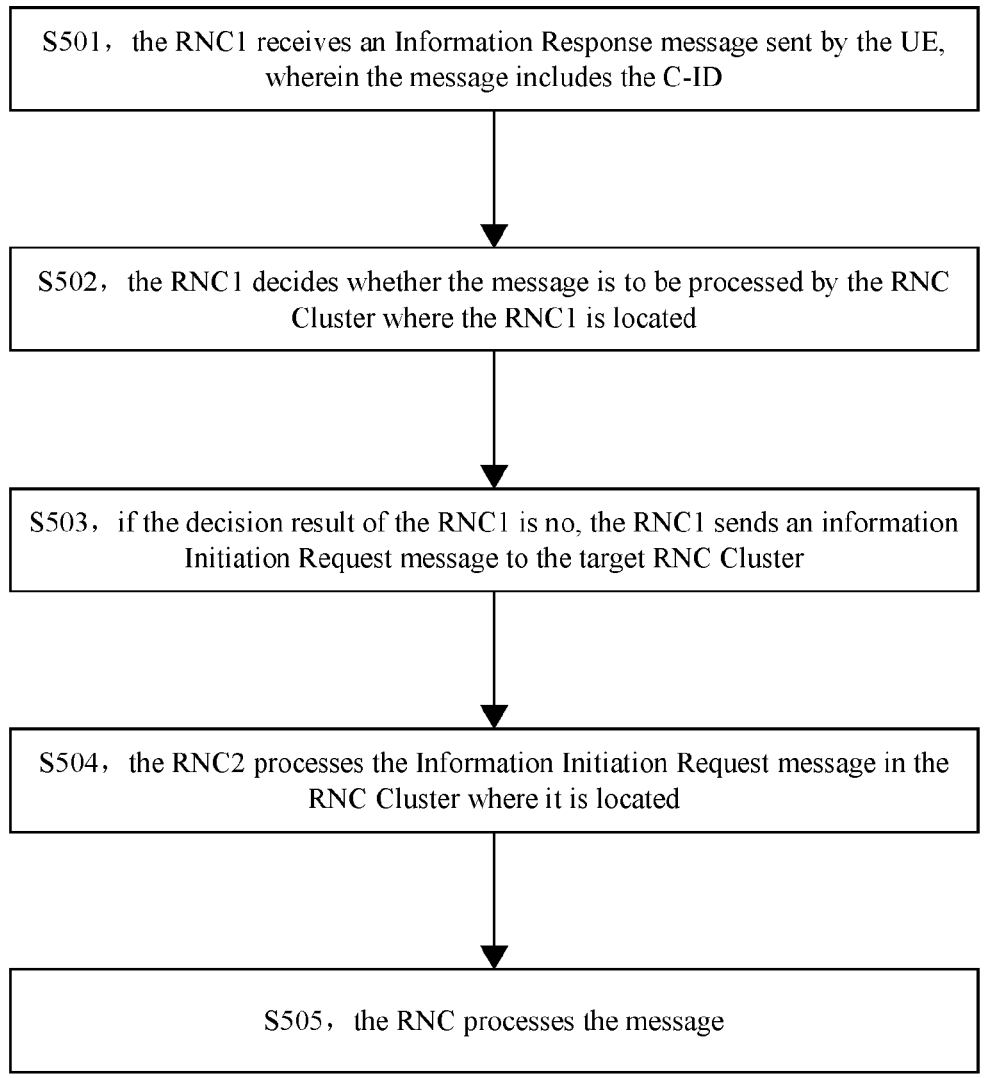
FIG. 5 is a flowchart of an ANR processing between RNC Clusters according to an embodiment of the disclosure.

FIG. 5 is a flowchart of an ANR processing between RNC Clusters according to an embodiment of the disclosure; as shown in FIG. 5, the processing flow specifically includes the following steps:

Step 501: the RNC1 receives the UE Information Response message sent by the UE, wherein the message includes the first ID, namely the C-ID of the cell in the PLMN.

Step 502: the RNC1 resolves the first 12 bits according to the C-ID to serve as the RNC Cluster ID of the target RNC Cluster; and the RNC1 decides, according to the decision rule, whether the UE Information Response message is to be processed by the RNC Cluster where the RNC1 is located.

Step 503: if the decision result is no, then the UE Information Response message is not to be processed by the RNC Cluster where the RNC1 is located, and according to the obtained target RNC Cluster ID, the RNC1 sends an Information Exchange Initiation Request message to the target RNC Cluster.

Step 504: the RNC2 performs the internal processing according to the Information Exchange Initiation Request message sent by the RNC1, wherein the message includes the C-ID of the cell in the RNC.

The RNC2 performs the internal processing of the RNC Cluster to the Information Exchange Initiation Request message in any one of the following ways:

the RNCs in the RNC Cluster share a message queue; the RNC2 puts the Information Exchange Initiation Request message in the message queue, and sends the internal information request to the other RNCs in the RNC Cluster to trigger each RNC to check the second message; then each RNC decides, according to the second ID, whether the message is to be processed by it; or the RNCs in the RNC Cluster share a message queue; the RNC2 decides, according to the second ID, whether the message is to be processed by it; if so, the RNC2 processes the message; if not, the RNC2 puts the Information Exchange Initiation Request message in the message queue, and sends the internal message request to the other RNCs in the RNC Cluster to trigger each RNC to check the external message;

each RNC or the RNC2 decides, according to the second ID, whether the message is to be processed by it; if so, according to the C-ID in the message and in combination with its own RNC ID, the RNC composes the C-ID.

Step 505: only when the cell belongs to the RNC, the RNC processes the message, and sends a response message to the RNC1.

Figure 6:
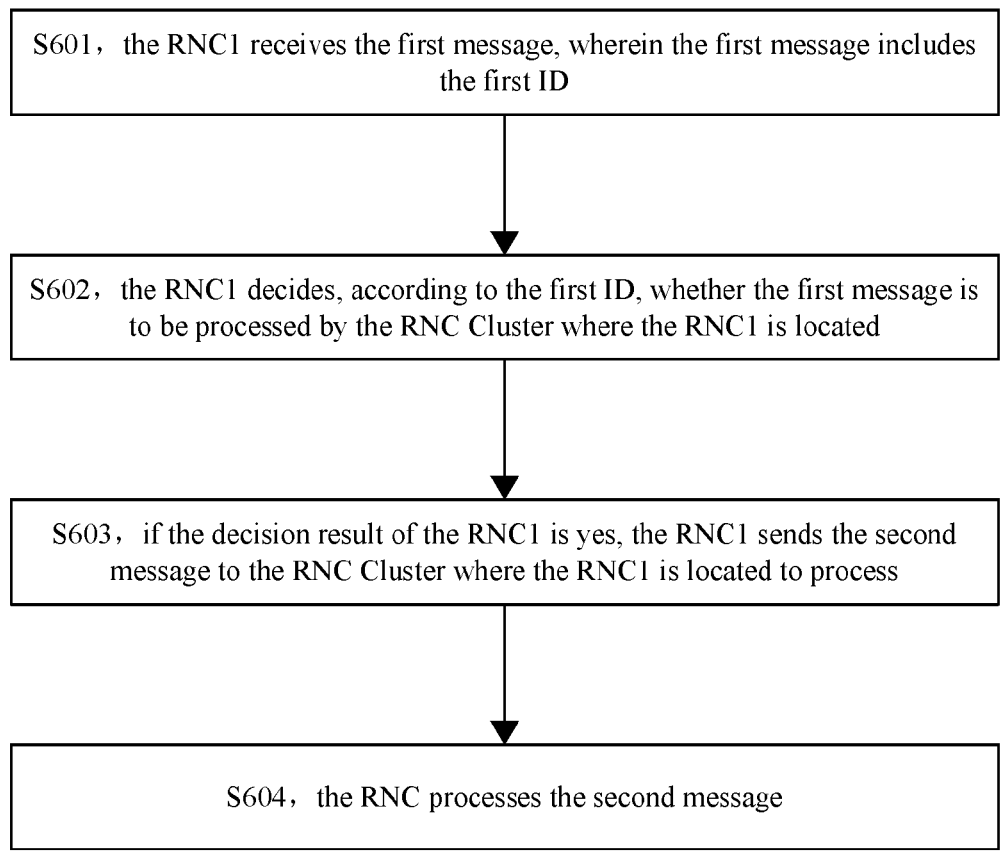
FIG. 6 is a flowchart of message processing in the RNC Cluster according to an embodiment of the disclosure.

FIG. 6 is a flowchart of message processing in the RNC Cluster according to an embodiment of the disclosure; as shown in FIG. 6, the processing flow specifically includes the following steps.

Step 601: the RNC1 receives the first message sent by the UE;

the first message is the URA Update message or the Cell Update message or the UE Information Response message; the corresponding first ID carried by the first message is the U-RNTI or the C-ID of the cell in the PLMN.

Step 602: the RNC1 resolves the first 12 bits according to the U-RNTI or the C-ID to serve as the RNC Cluster ID of the target RNC Cluster; and the RNC1 decides, according to the decision rule, whether the message is to be processed by the RNC Cluster where the RNC is located.

Step 603: if the decision result is no, the RNC1 sends the second message which is the Uplink Signalling Transfer Indication message or the Information Exchange Initiation Request message; the second message also includes a second ID, the second ID corresponding to the second message is the S-RNTI or the C-ID of the cell in the RNC; the RNC1 performs the internal processing of the RNC Cluster to the second message in any one of the following ways:

the RNCs in the RNC Cluster share a message queue; the RNC1 puts the second message in the message queue, and sends the internal information request to the other RNCs in the RNC Cluster to trigger each RNC to check the external message; then each RNC decides, according to the second ID, whether the message is to be processed by it; or the RNCs in the RNC Cluster share a message queue; the RNC1 decides, according to the second ID, whether the message is to be processed by it; if so, the RNC1 processes the message; if not, the RNC1 puts the second message in the message queue, and sends the internal message request to the other RNCs in the RNC Cluster to trigger each RNC to check the external message; each RNC or the RNC1 decides, according to the second ID, whether the message is to be processed by it; if so, the RNC composes, according to the S-RNTI or the C-ID in the message and in combination with its own RNC ID, the U-RNTI or the C-ID of the UE, and determines whether the message is to be processed by it according to the U-RNTI or the C-ID of the UE.

Step 604: the RNC processes the message.

Figure 7:
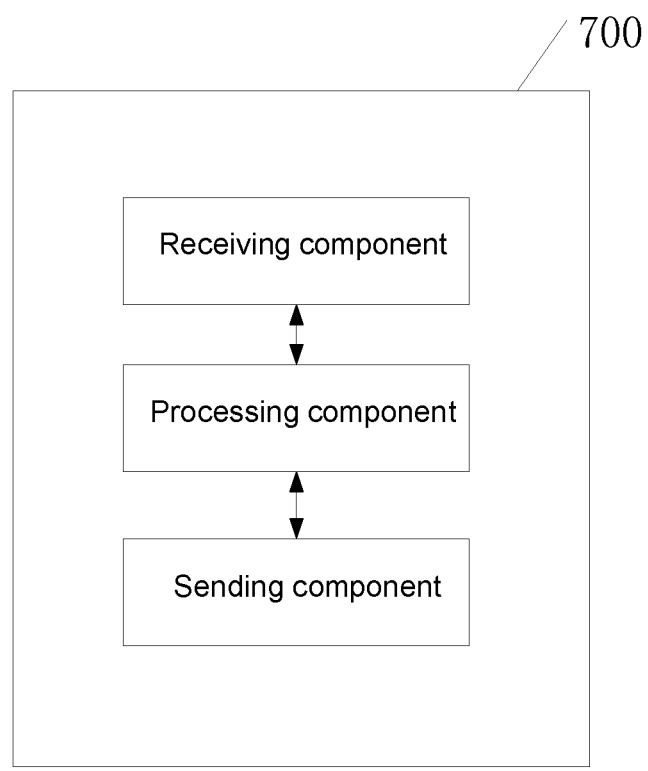
FIG. 7 is a structure diagram of an RNC according to an embodiment of the disclosure.

An embodiment of the disclosure also provides an RNC; as shown in FIG. 7, the RNC700 includes:

a receiving component, which is configured to receive the first message;

a processing component, which is configured to decide, according to the decision rule, whether the target RNC Cluster corresponding to the first message is the RNC Cluster where the RNC is located, wherein the RNC Cluster is composed of one or more RNCs;

if the decision result is yes, the RNC sends the second message to perform the internal processing of the RNC Cluster; if the decision result is no, the RNC sends the second message to the target RNC Cluster.

Wherein, the RNC Cluster has the RNC Cluster ID, and the value of the RNC Cluster ID is same as the first n bits of the RNC ID of the RNC in the RNC Cluster.

Wherein, the first ID is carried in the first message, and the processing component determines the target RNC Cluster according to the first ID.

Wherein, the second message also includes the second ID, and the processing component performs the internal processing of the RNC Cluster to the second message in any one of the following ways:

the RNCs in the RNC Cluster share a message queue; the processing component puts the second message in the message queue, and sends the internal information request to the other RNCs in the RNC Cluster to trigger each RNC to check the second message; then each RNC decides, according to the second ID, whether the message is to be processed by it; or, the RNCs in the RNC Cluster share a message queue; the processing component decides, according to the second ID, whether the second message is to be processed by it; if so, the processing component processes the message; if not, the processing component puts the second message in the message queue, and sends the internal information request to the other RNCs in the RNC Cluster to trigger each RNC to check the external message.

Wherein, the first message, the first ID, the second message and the second ID are any one of the followings:

the first message is the URA Update message, the first ID is the U-RNTI, the second message is the Uplink Signalling Transfer Indication message, the second ID is the S-RNTI; or the first message is the Cell Update message, the first ID is the U-RNTI, the second message is the Uplink Signalling Transfer Indication message, and the second ID is the S-RNTI; or the first message is the UE Information Response message, the first ID is the C-ID of the cell in the PLMN, the second message is the Information Exchange Initiation Request message, and the second ID is the C-ID of the cell in the RNC.

Although the disclosed implementations of the disclosure are described above, the contents are the implementations adopted only for facilitating understanding the disclosure and not intended to limit the disclosure. Those skilled in the art can make any modification and variation to the implementation forms and details without departing from the spirit and scope of the disclosure, but the scope of patent protection of the disclosure is still subject to the scope defined by the attached claims.

What is claimed is:

1. A method for moving User Equipment (UE), comprising:
   receiving, by a Radio Network Controller (RNC), a first message;
   according to a decision rule, deciding, by the RNC, whether a target RNC Cluster corresponding to the first message is a RNC Cluster where the RNC is located, wherein the RNC Cluster is composed of one or more RNCs;
   when the decision result is yes, then sending, by the RNC, a second message to the RNC Cluster where the RNC is located, and performing internal processing of the RNC Cluster on the second message; or, when the decision result is no, then sending, by the RNC, the second message to the target RNC Cluster, and performing processing on the second message via one RNC in the target RNC Cluster;
   wherein the second message comprises a second ID, and according to the second ID, the RNC performs the internal processing of the RNC Cluster on the second message in the following processing ways:
   RNCs in the RNC Cluster share a message queue; the RNC puts the second message in the message queue, and sends an internal information request to other RNCs in the RNC Cluster to trigger each RNC of the other RNCs to check the second message; then each of the other RNCs decides, according to the second ID and in combination with its own RNC ID, whether the second message is to be processed by the each of the other RNCs; or,
   the RNCs in the RNC Cluster share a message queue; the RNC decides, according to the second ID, whether the message is to be processed by the RNC; when the message is to be processed by the RNC, the RNC processes the message; otherwise, the RNC puts the second message in the message queue, and sends an internal information request to the other RNCs in the RNC Cluster to trigger each of the other RNCs to check the external message; then the each of the other RNCs or the RNC decides, according to the second ID and in combination with its own RNC ID, whether the message is to be processed by the each of the other RNCs or the RNC.

2. The method for moving the UE according to claim 1, wherein the RNC Cluster has an RNC Cluster Identity (ID), and the value of the RNC Cluster ID is same as the first n bits of an RNC ID of the RNC in the RNC Cluster.

3. The method for moving the UE according to claim 1, wherein the decision rule is as follows: a first ID is carried in the first message, and the RNC determines the target RNC Cluster according to the first ID.

4. The method for moving the UE according to claim 1, wherein,
the first message is a Universal Terrestrial Radio Access Network (UTRAN) Registration Area (URA) update message, the first ID is a UTRAN Radio Network Temporary Identity (U-RNTI), the second message is an Uplink Signalling Transfer Indication message, and the second ID is a Serving Radio Network Controller (SRNC) RNTI (S-RNTI); or
the first message is a Cell Update message, the first ID is the U-RNTI, the second message is the Uplink Signalling Transfer Indication message, and the second ID is the S-RNTI; or
the first message is a UE Information Response message, the first ID is a Cell ID (C-ID) of the cell in a Public Land Mobile Network (PLMN), the second message is an Information Exchange Initiation Request message, and the second ID is a C-ID of the cell in the RNC.

5. The method for moving the UE according to claim 1, wherein an internal custom message or a standard Iur interface message is adopted among the RNCs in the RNC Cluster.

6. A Radio Network Controller (RNC), comprising:
a receiving component configured to receive a first message;
a processing component configured to decide, according to a decision rule, whether a target RNC Cluster corresponding to the first message is the RNC Cluster where the RNC is located, wherein the RNC Cluster is composed of one or more RNCs;
when the decision result is yes, the processing component sends a second message to the RNC Cluster where the RNC is located, and performs internal processing of the RNC Cluster on the second message; or, when the decision result is no, the RNC sends the second message to the target RNC Cluster and performs processing on the second message via one RNC in the target RNC Cluster;
wherein the second message comprises a second ID, and according to the second ID, the processing component performs the internal processing of the RNC Cluster on the second message in the following processing ways:
RNCs in the RNC Cluster share a message queue; the processing component puts the second message in the message queue, and sends an internal information request to other RNCs in the RNC Cluster to trigger each RNC of the other RNCs to check the second message; then the each of the other RNCs decides, according to the second ID and in combination with its own RNC ID, whether the message is to be processed by the each of the other RNCs; or,
the RNCs in the RNC Cluster share a message queue, the processing component decides, according to the second ID, whether the second message is to be processed by the RNC; when the second message is to be processed by the RNC, the processing component processes the message; otherwise, the processing component puts the second message in the message queue, and sends the internal information request to the other RNCs in the RNC Cluster to trigger the each of the other RNCs to check the external message; then the each of the other RNCs or the RNC decides, according to the second ID and in combination with its own RNC ID, whether the message is to be processed by the each of the other RNCs or the RNC.

7. The RNC according to claim 6, wherein the RNC Cluster has an RNC Cluster Identity (ID), and the value of the RNC Cluster ID is same as the first n bits of an RNC ID of the RNC in the RNC Cluster.

8. The RNC according to claim 6, wherein the decision rule is as follows: a first ID is carried in the first message, and the processing component determines the target RNC Cluster according to the first ID.

9. The RNC according to claim 6, wherein,
the first message is a Universal Terrestrial Radio Access Network (UTRAN) Registration Area (URA) update message, the first ID is a UTRAN Radio Network Temporary Identity (U-RNTI), the second message is an Uplink Signalling Transfer Indication message, and the second ID is a Serving Radio Network Controller (SRNC) RNTI (S-RNTI); or
the first message is a Cell Update message, the first ID is the U-RNTI, the second message is the Uplink Signalling Transfer Indication message, and the second ID is the S-RNTI; or
the first message is a UE Information Response message, the first ID is a Cell ID (C-ID) of the cell in a Public Land Mobile Network (PLMN), the second message is an information exchange initiation request message, and the second ID is a C-ID of the cell in the RNC.

10. The RNC according to claim 6, wherein an internal custom message or a standard Iur interface message is adopted among the RNCs in the RNC Cluster.

* * * * *